United States Patent

Killgore

[11] 3,883,310
[45] May 13, 1975

[54] TAPERED ORE LEACHING VESSEL

[75] Inventor: Clearl Don Killgore, Redondo Beach, Calif.

[73] Assignees: Clearl D. Killgore; Harold Von Killgore, both of Redondo Beach, Calif. ; part interest to each

[22] Filed: June 5, 1972

[21] Appl. No.: 259,436

[52] U.S. Cl. ............ 23/267 R; 23/271 R; 23/272 R; 23/283; 261/DIG. 9
[51] Int. Cl. ............................................. B01d 11/02
[58] Field of Search ............ 23/272.6 R, 271, 267 R, 23/270, 283, 309, 311, 272, 284, 285; 159/13 A; 261/DIG. 9, 18

[56] References Cited
UNITED STATES PATENTS

| 323,755 | 8/1885 | Thompson | 23/272 |
|---|---|---|---|
| 741,189 | 10/1903 | Thompson | 23/271 |
| 853,575 | 5/1907 | Boileau | 23/271 |
| 981,098 | 1/1911 | McCaspell | 23/272.6 R |
| 1,197,067 | 9/1916 | Schieren | 23/272 |
| 1,511,238 | 10/1924 | Singer | 23/272 |
| 2,101,112 | 12/1937 | Vicary | 261/DIG. 009 |
| 2,147,162 | 2/1939 | Haglund | 23/283 |
| 3,199,958 | 8/1965 | Skogh | 23/283 |
| 3,540,880 | 11/1970 | Spedden | 23/271 |
| 3,547,980 | 12/1970 | Ramada et al. | 23/283 |
| 3,595,297 | 7/1971 | Berg | 159/13 A |

FOREIGN PATENTS OR APPLICATIONS

| 594,635 | 1959 | Italy | 23/270 R |
| 701,135 | 1930 | France | 23/271 |
| 498,371 | 1953 | Canada | 23/272.6 |
| 923,889 | 1963 | United Kingdom | 159/13 A |
| 642,417 | 1928 | France | 23/271 |
| 338,925 | 1921 | Germany | 23/271 |

*Primary Examiner*—Norman Yudkoff
*Assistant Examiner*—S. J. Emery
*Attorney, Agent, or Firm*—Allan Miller

[57] ABSTRACT

An expanding vessel for ore separation through leaching is disclosed; said vessel being expanded outward from the top so as to be of increasing size towards the bottom. Near the bottom of the vessel are desanding chambers for the removal of fines and slimes from the leaching solvent. The unique shape of this vessel permits the leaching solvent to come in contact with a greater surface area of ore material so as to yield a more concentrated solution of metals. The ore is introduced into the top of the vessel and flows downward and outward while being subjected to the action of leach liquors such as sulfuric acid, etc., which are injected at various points along the length of the walls of the vessel. As the leach liquor percolates downward, heated air is injected into the bottom of the vessel, thereby acting as a catalyst in promoting increased oxidation and a greater concentration of metal in solution. The spent ores and tails are then removed from the vessel through regulated discharge ports at the bottom of said vessel and subsequently carried away from the vessel by a conveyor or other suitable means.

4 Claims, 4 Drawing Figures

PATENTED MAY 13 1975

TAPERED ORE LEACHING VESSEL

BACKGROUND OF THE INVENTION

At the present time, copper and other metals are produced primarily through the use of conventional methods such as milling, smeltering and refining of ores. Only a small percentage of the total copper production is by means of chemical extraction in which leaching liquors, such as sulfuric acid, are used to dissolve the metal from the ore into solution; the dissolved metal then being precipitated out and recovered. Chemical extraction of metals from ores is referred to in the prior art as "leaching."

The principal methods of leaching copper ores at the present time are heap, dump, in-place, and vat-leaching.

In the heap-leaching method, acid leach solutions are dispersed over a large heap of ore; the acid leach solutions then percolate downward and through the ore bed by gravity means and are later drained from a prepared drainage pad upon which the ore had been previously placed. Usually several months elapse before a sufficient quantity of metal can be recovered from the ore in this manner.

In the dump-leaching method, acid-free leach liquors percolate downward and are regenerated through the breakdown of the sulfide minerals within the dump itself. The leaching cycle in this case is usually measured in terms of several years or more.

In the vat-leaching method, the ores are first crushed and then leached in large vats with a leach solution, such as sulfuric acid. A higher percentage of copper or other metals is usually recovered in a shorter time by this method than in the previous methods discussed. However, vat-leaching is comparatively expensive in that the ore must be removed outward and upward from the vat by an expensive and time-consuming operation.

The need for a new type or means of chemical extraction of metals from low grade ores from dumps, tailings and ore bodies of a grade too low to treat otherwise by the above mentioned methods, represents an enormous untapped potential source of all types of metals. The methods of chemical extraction currently known, are either economically disadvantageous or do not produce a sufficiently high enough concentration of ore in solution to make the operation profitable. It will be seen that the proposed invention enables the mining industry to economically separate metal from even very low grade ores by the leaching operation.

Among the most important factors that influence the amount of metal dissolved in solution are: the pH of the leach solution; the temperature of the leach solution; the amount of bacteria present in the leach solution; the amount of iron salts in the leach solution; the amount of air or oxygen in the leach solution; and perhaps most important, the extent or degree of surface contact of the ore materials with the leaching solution. As will be seen from the description that follows, this novel and unique shaped vessel permits all of these factors to be resolved in a more favorable fashion than in the prior art.

The pH of the solution must be low enough to permit an adequate concentration of acid for dissolution of the copper minerals. In addition, should the solution become alkaline or less acidic, the bacteria, which act as catalysts in the oxidation reaction, are more likely to be destroyed. A low pH also minimizes the precipitation of iron within the pipelines and the ore containers. The proposed invention enables the operator to easily regulate and maintain a low pH through the introduction of acid leach solutions at various positions in the length of the vessel walls. In this way, the solutions can be replenished in proportion to the extent of which they are being used up. The activity of the acid leach solutions on the ores will increase as the surface contact increases between the acids and the ores, thus, resulting in higher acid consumption. In this manner, the regulation of the acid content by means of the injection ports within the walls of said vessel will be most helpful in promoting the oxidation of the ore.

Another important factor that affects the rate of dissolution of copper from the ore material is the temperature of the leach solution. The chemical reaction in which the metal is dissolved by the leaching liquor, such as sulfuric acid, is essentially an oxidation-reduction reaction in which the ore is oxidized. The amount of oxidation directly influences the amount of metal that is dissolved and later precipitated. It is known in the prior art that bacteria causes a microbial reaction that increases the extent of oxidation. Temperature has been found to be one of the most important factors in this microbial reaction. The proposed invention provides an excellent means of maintaining the optimum temperature to achieve the greatest amount of oxidation in a simple, efficient and economical manner. As will be seen, this is accomplished essentially by injecting regulated amounts of air upward into the solution at a desired temperature. The air also replaces the oxygen that had been used up during the above mentioned chemical process.

As discussed above, the presence of bacteria in the leach solutions promotes and accelerates oxidation of the ore material to metal compounds which can be dissolved in solution and later precipitated and recovered. The oxidation rates may indeed be magnified enormously by the extent and type of bacteria present. Most of these bacterial types that would promote the rapid oxidation are of a type that thrive in the absence of bright light. Consequently, the proposed vessel method of leaching has a distinct advantage over the open-vat method where the presence of sunlight in an outdoor environment will tend to destroy these desirable bacteria. It has also been demonstrated that aerating the bacterial solutions with a steady source of air into different portions of the solution and increased circulation of the solution would cause the bacteria to thrive in a more suitable environment. The proposed invention accomplishes these objectives by the injection of air in an upward manner into the solutions.

Another factor of importance is the amount of iron salts in solution, since a higher concentration of iron salts in solutions will tend to decrease the amount of the concentrated metal in solution sought to be precipitated out through the leaching process. The higher the pH of the solution, the less the amount of salts formed. As mentioned above, the novel invention provides a very suitable means for regulating the pH by injection of acid leach liquors through ports within the walls of the vessel. A low pH is required to prevent the formation of iron salts and to redissolve the salts after they have been precipitated. Strict control of the pH is necessary to minimize the precipitation of the iron salts.

Another distinct advantage of the proposed vessel means of leaching is that the losses of pregnant liquor, containing the dissolved metals, are much lower than would occur in the open-vat method where the solutions, being exposed to large quantities of air would cause a greater evaporation of the leaching liquors as well as the pregnant liquors.

Finally, and perhaps the most important of all factors to be considered, is the extent of surface contact between the ore and the leaching solution. The greater the surface area of the ore that can be exposed to the action of the leaching solution, the greater the amount of copper going into solution and ultimately recovered. Thus, in order to make it economically feasible to recover a sufficient amount of copper from even low grade ore deposits, it is essential to create a system in which the largest amount of surface area of the ore can come in contact with the leaching solution.

Research studies as well as operational use has shown that in a mass of ore containing coarse particles as well as fines and slimes, the finer particles will tend to compact at one or more areas inside a column or vessel. This compaction of the fines is extremely detrimental to the working action of the leaching solution, since the compacted material will become relatively impervious, thus resisting the passage or flow of leaching solution through said fines. This resistance to flow through the compacted fine material then causes the leaching solution to channel in different directions around the larger coarse materials. The affect of this channeling is to expose the leaching solution to a minimal surface contact with the ore, thus preventing the solution from coming in contact with enough of the surface area to yield a sufficiently high yield of copper in solution. The proposed unique vessel and leaching system eliminates this problem of compaction of fines and channeling of the leaching solution, thereby resulting in as much as ninety nine percent (99 percent) or more of the surface area of the ore coming in contact with the leaching solution. In addition, this then permits the leaching solutions to flow down into the pores of the ore resulting in a significantly greater amount of metal, such as copper, going into the solution. One of the ways that this is accomplished in the present system is to first screen the ore and then crush and wash said ore prior to introduction of the ore into the proposed vessel. This preliminary procedure results in most of the fines and slimes being removed from the ore before the ore goes into the vessel. Since the amount of fines and slimes then remaining in the washed ore introduced into the vessel is relatively small, there will be less of a problem of compaction of the fines and less danger of channeling of the leaching solution.

Furthermore, it is the unique shape of this expanding vessel, increasing in size from top to bottom, that permits a much greater surface contact between the ore and leaching solution. Gravity will cause the ore bodies to move downward into the vessel; and the expanding walls of said vessels will further cause the ore to move down and outward following the shape of the vessel. This tends to further avoid the problem of compaction in certain areas or within the center of the vessel. The amount of time, of course, that the ore remains in the vessel is dependent upon the average leach cycle of the ore being treated.

Another distinct advantage of the proposed invention is that the bottom of said vessel are a system of doors or gates for regulating the amount of spent ore tails and acid solution that can be removed from the vessel. The doors are opened at different times in a predetermined sequence, thus, preventing the compaction of materials near the center of the vessel. Since the doors are positioned at various heights within the vessel, the doors closest to the walls of the vessel being lower in height than those near the center of the vessel which are higher, results in a greater area in which the leaching solution can come in contact with the ore, since the ore will have a tendency to move down and outward because of the vessel shape.

In addition, the introduction of air from ports at the bottom of the vessel up and into the vessel will result in greater agitation of the leaching solution, thereby permitting a larger surface contact. Thus, it can be seen that the unique shape of the leaching vessel provides a means for the ore to move downward through the vessel, without compacting or concentrating in certain areas of the vessel; allows a greater amount of mixing, stirring, and or agitation of the ore, thereby providing a greater surface contact of the leaching solution and oxygen with the ore. In addition, the temperature of the vessel can be controlled by the inventive concept of introducing air under pressure from the bottom of the vessel, the air tending to move upward upon heating and to increase the amount of agitation of the solution and thereby increasing the extent of oxidation. Then by the proper manipulation of the discharge doors or gates, an even flow of ore material can be maintained through the vessel, thus, permitting a greater amount of surface contact.

Even though the factors discussed above were recognized as being important in the prior art of chemical extraction of ores through leaching, a method of leaching low grade ores did not exist which resolved and treated all of these factors as favorably as the proposed invention. Thus, the proposed invention provides an economical method for recovering metals from even low grade ore deposits.

The known prior art related to ore leaching apparatus includes the following U.S. Pats. : Nos. 660,499; 1,330,463; and 2,131,166.

SUMMARY OF THE INVENTION

The invention comprises an expanding vessel to separate desired metals from ore through the leaching process. The vessel is expanded outward from the top so as to be of increasing size towards the bottom; thus permitting the ore materials and leaching liquors to flow downward and outward to achieve a greater surface contact between the ore materials and the leaching solutions. This will result in a greater amount of copper and or other metals going into solution and ultimately being recovered by precipitation or other means. Consequently, the leaching of even low grade ores can be profitable using this type of vessel and system.

The ore is removed from the ore deposit and first screened, crushed and washed by conventional means to separate the fines and slimes from the coarse ore material. The remaining coarse ore is then introduced into the top of the novel vessel. The coarse ore is then allowed to move downward and outward following the shape of the vessel. Of course, the time that the ore will be subjected to the action of the leaching liquors will depend upon the predetermined leach cycle of said ore.

Injection ports are installed at various locations along the walls of the vessel, thus providing a means of replenishing the acid leaching solutions and achieving a greater supply of the acids in the areas in which they will be consumed more, due to the greater amount of surface contact between the acid solution and the ore.

While the acid leaching solutions are percolating downward, air is injected under pressure upward into the vessel to permit better stirring and agitation of the solution while it is leaching the ore and to replace the oxygen being used up during the chemical process that dissolves the metal into solution. The air may be introduced at a desired temperature to optimize the growth of the bacteria and to catalyze the oxidation rate.

At the bottom of the vessel are regulated doors or gates located at different heights within the vessel to control the amount of spent ore and tails and solvent being removed from the vessel, and to control in a predetermined manner the length of time the ore will be subjected to the leaching solutions.

Even though the ore has been screened, crushed, and washed to remove the fines and slimes prior to the introduction of the ore into the vessel, there will still be some fines in the vessel due to the agitation and movement of the ore as it is passing through the leaching vessel. The present invention provides a unique method for removing the fines from the pregnant liquor solutions containing the dissolved metals. The fines will tend to collect or settle about the sides of the vessel so that desanding chambers are provided to control the level of liquid inside the chamber to thus allow the fines to settle near the bottom of the chambers and to permit the liquor transfer pumps to carry away the pregnant liquor solutions which have been essentially freed of fines and slimes. This provides a more suitable means for recovery of the pregnant liquor and an easier method for regeneration of the leach liquor to be used again in the next leaching cycle.

The spent ores and tails can be removed from the vessel after passage through the controlled doors or gates by means of a conveyor belt system or other suitable means.

BRIEF DESCRIPTION OF THE DRAWINGS

FIG. 4 is an isolated fragmentary view of the details of the lower portion of the structure shown in FIG. 2.

DETAILED DESCRIPTION OF THE PREFERRED EMBODIMENT

Figure 1:
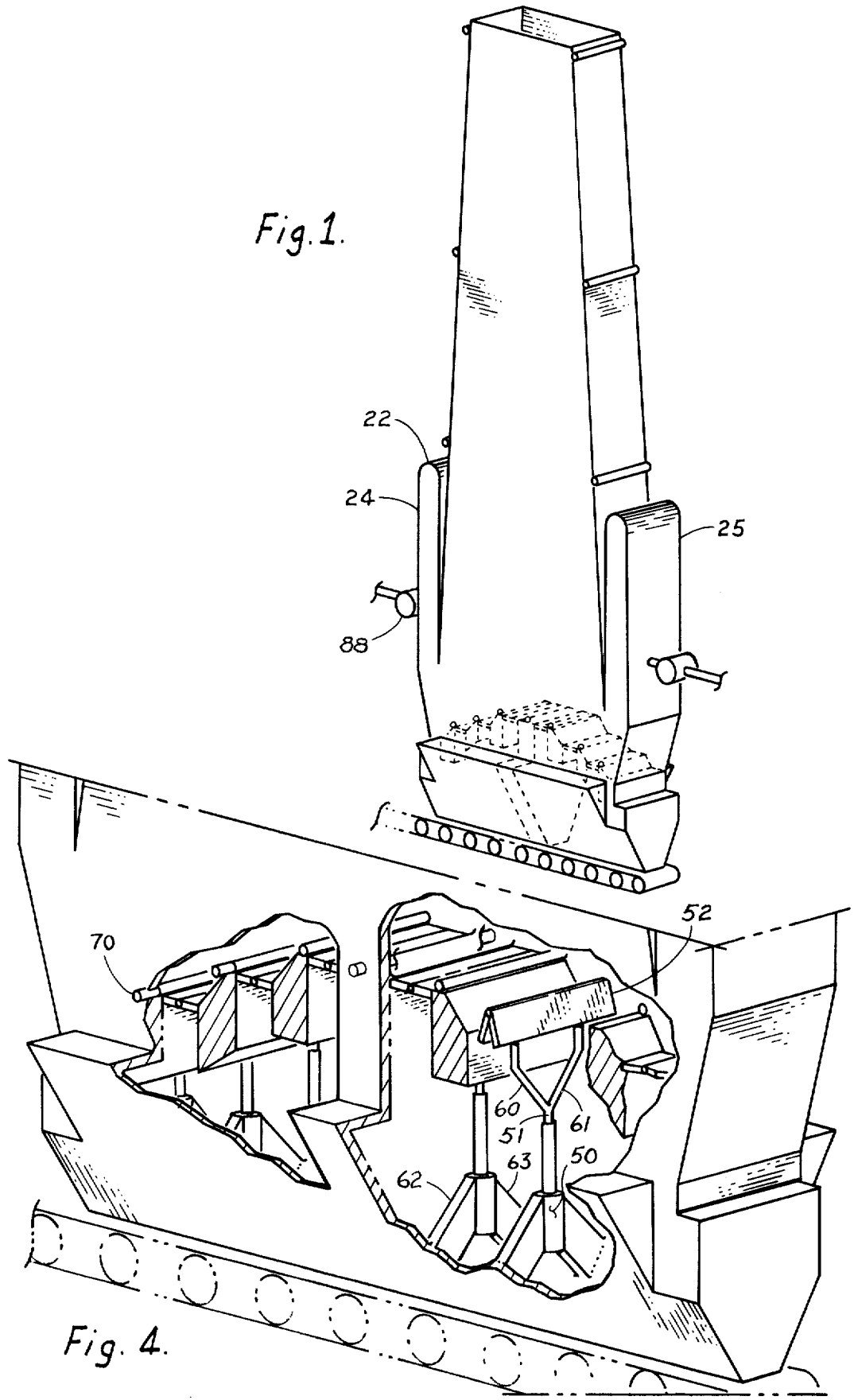
FIG. 1 is a over-all perspective view of the inventive vessel means described herein.

Referring to FIG. 1, it may be seen that the invention in this case contemplates an expanding vessel to separate metals from their ores by the leaching process. The exterior walls of the vessel expand in such a manner so that the vessel increases in size from top to bottom.

It will be understood that whenever the term "expanding vessel" is used herein, this denotes a structural shape of an upright elongate walled vessel of tapered form having a minimum cross-sectional area at the uppermost end thereof enlarging, at a uniformly changing rate, along the length thereof to a maximum cross-sectional area proximate the lower end thereof for containing the ore.

Figure 2:
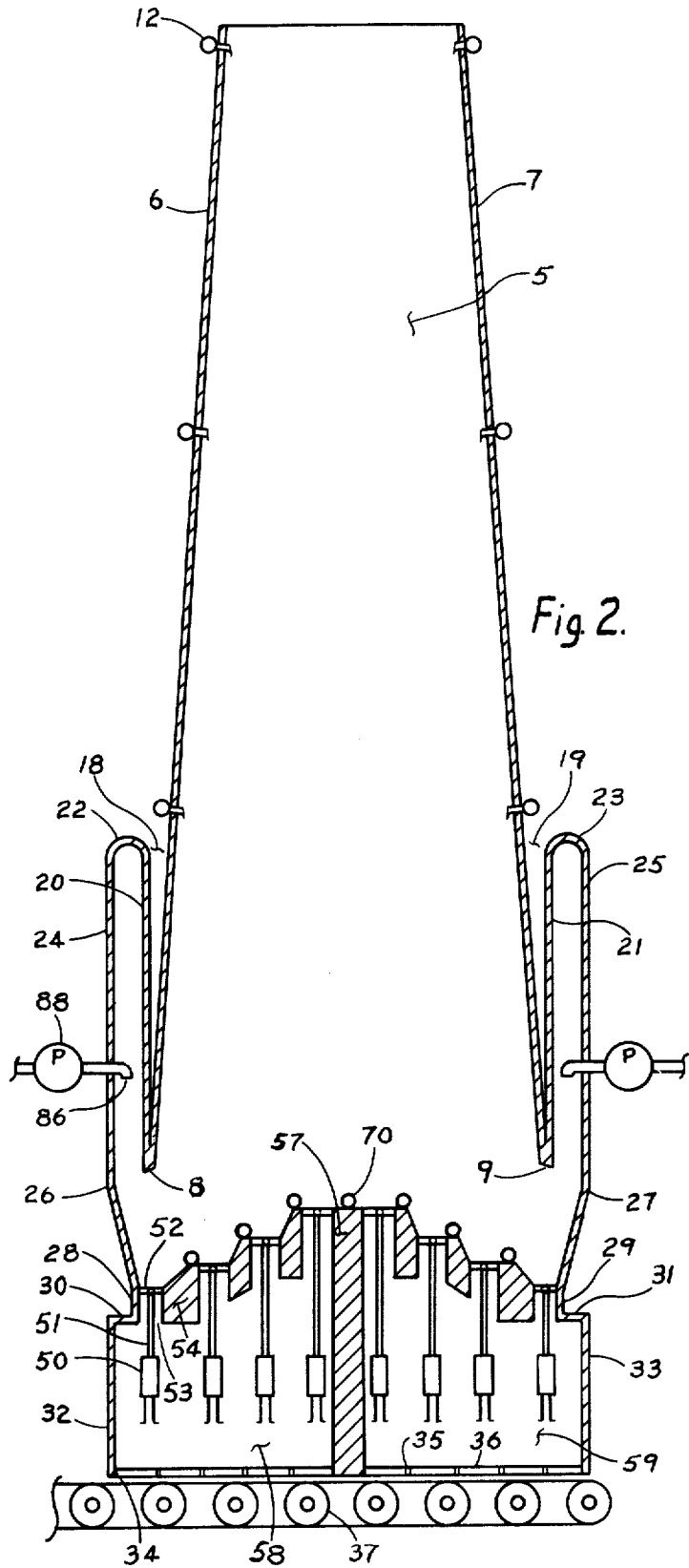
FIG. 2 is a front cutaway view of the inventive vessel means described herein.
Figure 3:
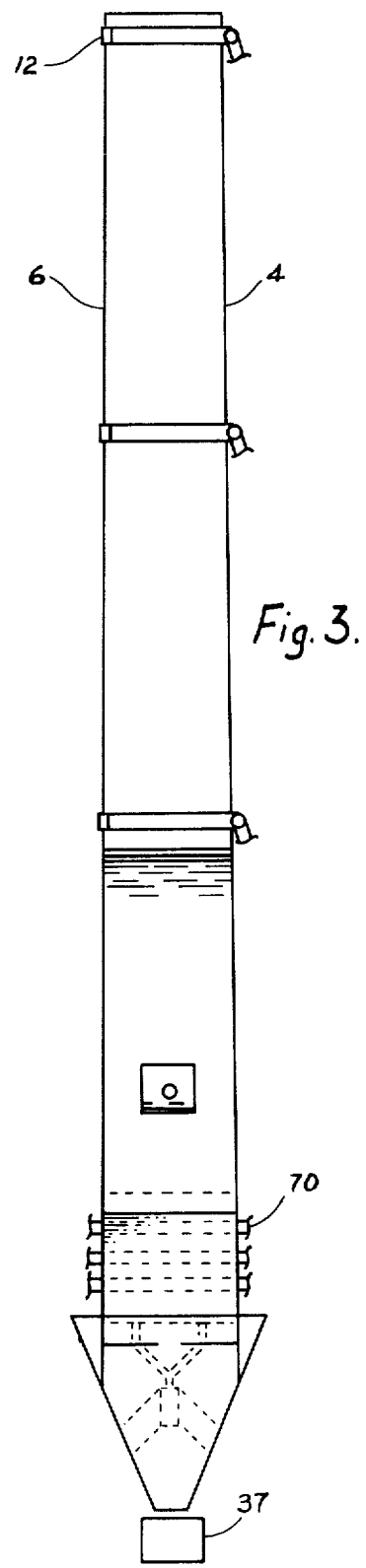
FIG. 3 is a side view of the inventive vessel means described herein.

It may be seen from FIGS. 1, 2, and 3 that the preferred embodiment comprises a hollow elongate tapered vessel having a cross-sectional area becoming larger at a uniformly changing rate along the length thereof from the topmost to the lowermost end of the vessel. The vessel has four walls, essentially at right angles to each other. Opposite walls are of equal size and walls adjacent to one another are of different size. It can thus be seen that in FIG. 1, the over-all perspective view of the vessel, the front and rear walls are considerably larger in width than the side walls. However, this is only a description of the preferred embodiment; and an expanding vessel incorporating this novel feature might well be cylindrical in form and flared at the bottom and need not have the walls at right angles to one another as depicted in the preferred embodiment, as long as the cross-sectional area increases from top to bottom.

The ore is first screened, crushed, and washed by conventional means to remove the fines and slimes from the ore before loading the ore into the vessel. The vessel is designed primarily for the leaching treatment of coarse ore material. The ore is loaded into the vessel by conventional means and is allowed to fall within the open area generally depicted as 5.

The exterior walls 6, and 7, which are parallel or approximately parallel to one another at the topmost end of the vessel, expand outward from one another, at a uniformly changing rate along the length thereof towards the bottommost end of the vessel. Walls 6, and 7 expand outward until they reach 8, and 9, respectively, at which time the exterior walls turn upward and are shown as 20, and 21, separated by space gaps 18, and 19, between walls 20, and 6; and 21, and 7, respectively.

The exterior walls then arch at 22, and 23, and then turn downward as shown by 24, and 25. Walls 24, and 25 are substantially perpendicular to the bottommost wall 34 and are parallel to one another until they reach points 26, and 27 respectively which turn inward to each other at a uniformly changing rate until they reach walls 28, and 29 respectively which are again parallel to each other; perpendicular to walls 28, and 29 are walls 30, and 31, respectively. Walls 32, and 33 are perpendicular to bottom wall 34 and are parallel to each other.

It may be seen that walls 20, 22, and 24 form an upstanding hollow elongate chamber at the side of the vessel having an open base portion on said chamber communicating with the interior of the vessel 5, and fluid removal means connected to said chamber comprising a pipe 86, connected to a liquid transfer pump 88, connected to the chamber intermediate the ends thereof and adapted to remove fluid from said chamber at a fluid level higher than said open base portion. Said upstanding hollow elongate chamber may be referred to as a "desanding chamber", the purpose of which is to remove the sand and fines from the pregnant liquor solutions containing the dissolved metal, before the solutions are removed by pipe 86 connected to pump 88 and transferred to a reconditioning reservoir. The pregnant liquor solution is then ultimately passed through conventional means to precipitate out the copper metal from the ore; and the solution from which the desired metals have been removed is then replenished for further use in another leaching cycle. There is thus provided a suitable means to control the liquid level within the vessel and also to aid in the removal of fines that may have been created by the agitational movement of the ore down through the vessel after its introduction into the vessel. The fines would then normally settle out near the bottom of the desanding chamber and would be removed from the pregnant liquor solution before it is drawn into the pipe 86.

Manifold means, collectively referred to as 12, each of which is identical in structure and function is connected to said vessel for injecting leaching solution into said vessel at a plurality of locations along the length of said vessel between said uppermost end and said lower end thereof. Said manifold means includes at least two separate manifolds adjacent said vessel at two vertically spaced apart locations along the length of said vessel, each of said manifolds having a plurality of individual passages communicating said manifolds to said vessel.

Having the manifold means at a plurality of locations along the length of said vessel enables a more accurate method of regulating the flow of acid and or leaching solution into the vessel. Having the manifold means at a plurality of locations along the length of said vessel provides an advantageous method for replenishing the acid solution as it is being used up. The extent of the acid used will depend upon the amount of oxidation reduction activity in the chemical reaction between the ore and the acid leaching solution, such as sulfuric acid. The ore will have a tendency to move downward and outward due to the shape of the vessel and will result in a greater area of surface contact of the ore with the acid leaching solution as the ore moves down and outward through the vessel. Since the amount of surface area contacted with the leaching solution will influence the amount of acid used up, it can be seen that placing the injection leaching solution manifold means in these positions along the length of the vessel, will result in having the acid solutions and or leaching solutions replenished in proportion to the amount in which they are used up. Thus, this invention provides a convenient means for regulating the flow of acid and or leaching solution into the vessel which is then allowed to percolate downward through the ore being leached. It is, of course, understood that the leaching solutions injected in this manner may or may not be acidic; and that the term "leaching solution" as used herein is to be interpreted in the broadest sense.

A plurality of air injection ports collectively referred to as 70, each of which is identical in structure and function, provide a means for the introduction of fluids such as air and or gasses, under pressure, into an area proximate the lower end of the vessel. The ports may be individual vertically and laterally spaced-apart passages through the walled vessel. The air can thus be forced upward into the leaching solutions to cause a greater agitation and stirring action of the solution to increase the amount of surface contact between the ore and leaching solution resulting in a higher yield of copper and or metal in solution. The air and or gas of any desired temperature may be introduced into the vessel in this manner to control or increase the rate of oxidation and to influence the amount of bacterial action which acts as a catalyst in promoting greater oxidation. Furthermore, the air introduced in this manner can be used to replenish the supply of air that had been consumed during the oxidation process. It will be seen in the preferred embodiment that the fluid injection port 70 may comprise a pipe which rests upon the solid wall of cement or concrete for support. However, the port means may be mounted anywhere proximate the lower end of the vessel.

A plurality of hydraulic cylinders proximate the lower end of the vessel, collectively referred to as 50, each cylinder being identical in structure and function is used to control the movements of a plurality of pistons, collectively referred to as 51, each piston being identical in structure and function. The pistons are used to raise or lower a plurality of trap doors, collectively referred to as 52, each trap door being identical in structure and function. Any trap means mounted proximate the lower end of the vessel may be used for trapping ore leached by the leaching solution. However, in the preferred embodiment, as shown in FIG. 2, there are a plurality of trap doors, collectively referred to as 52, that are spaced at different vertical heights relative to the lower end of the vessel. In the preferred embodiment as shown in FIG. 2, there are a plurality of channels, collectively referred to as 53, each channel being identical in structure and function. However, the channels, 53 are in spaced-apart relationship and at varying vertical heights relative to the lower end of the vessel. Each of said channels 53 has a trap door 52 mounted at the upper end thereof adapted to be selectively opened to receive the leached ore.

Between the channels, collectively referred to as 53 are a plurality of solid walls, collectively referred to as 54, each wall being identical in function and composed of either cement or concrete. However, while the purpose of each such solid wall, collectively referred to as 54 is the same, that is to separate the channels, each of which has a trap door mounted at the upper end thereof, these solid walls, 54 vary in height relative to the lower end of the vessel and may vary in their width or cross-sectional area and may be parallel to or at different angles to the bottom wall of the vessel, referred to as 34, as shown in the preferred emobodiment in FIG. 2.

The center wall 57, proximate the lower end of the vessel and perpendicular to the bottom wall 34 serves as a divider between two common areas 58, and 59 into which the spent ore material and solvents will flow when the trap doors 52 are selectively opened. It will be seen in FIG. 2 in the preferred embodiment that half the ore material will pass through each of the trap doors 52 located to the left of the center wall 57 down through channels 53 and that each of the channels will then open up into common area 58 into which the spent ore material and solvents will flow. Similarly, it can readily be seen that on the right of center wall 57 the ore material passing through to the right of 57 will pass through the trap doors and channels and open into common area 59. This division of the flow of spent ore material and solvents into common areas 58 and 59 provides a more suitable method for regulating the flow of the ore material down through the vessel and for later avoiding problems of congestion in the ultimate removal of the spent ore material and solvents from the vessel. The bottommost wall of the vessel previously referred to as 34 is comprised of a plurality of partitions, collectively referred to as 35, each partition being identical in structure and function and is used to separate a plurality of sliding doors, collectively referred to as 36, each sliding door being identical in structure and function. After the spent ore material and waste solvents have passed into common areas 58, and 59, said material and solvents can then be removed by selectively opening the sliding doors 36 at the bottom of the vessel. After the spent ores and solvents have passed through the sliding doors they may then be removed by means of a conveyor 37, or other suitable means adapted to transfer or carry away said spent ore and solvents from the leaching vessel itself.

Referring to FIG. 4, a plurality of trap doors, collectively referred to as 52, may be seen in more detail. The trap door 52 is raised by arms 60, and 61, essentially forked in nature connected to piston 51, or adapted to engage piston 51, which is moved upward and downward by hydraulic cylinder 50. In the preferred embodiment, hydraulic cylinder 50 is supported by forked pillars 62, and 63 made of structural materials such as cement or concrete, to provide support means for the hydraulic cylinder 50 and to provide an arch or passageway under which the spent ore and solvent can be allowed to fall to the bottom of the vessel 34. The material can then be removed in a regulated manner through the sliding doors 36.

In the preferred embodiment, the trap door 52 will be hinged in a conventional manner so that when the piston 51 is raised by the hydraulic cylinder 50, the arms 60, and 61 will then cause said trap door 52 to move upward taking the shape of an inverted-V when it is fully opened, so that the opposite ends of the trap door tend to draw closer together as it is being opened, thus permitting a passageway for the movement of the spent ores or tails and spent solvents through that particular trap door. The operation of the hinged trap door in this manner results in less vertical movement of the trap door 52 that would be required if the door were not hinged. Because less vertical movement is required, a smaller hydraulic cylinder 50 can be used, said cylinder being shorter in height and thus permitting a larger area under which the spent ore material can pass under forked pillers 62 and 63. This permits a more suitable means for removing the spent ore material from the vessel itself. In addition, the hinged trap door 52 which forms the shape of an inverted V when fully opened, permits a wider passageway than a non-hinged door, to facilitate movement of the ore material around the trap door into their respective channels, thus creating a better flow distribution of the ore material and permitting quicker and more efficient removal of the spent ore materials.

As may be seen from FIG. 3, it is contemplated that the exterior walls of the vessel 6, and 4, when viewed from the side of said vessel, are considerably closer together than walls 6, and 7, when viewed from the front of said vessel. Furthermore, it can be seen that walls 6 and 7, as viewed in FIG. 2 expand outward in a far greater distance from one another than do walls 6 and 4. Thus, in the preferred embodiment, the widths across the front and rear walls are greater then the widths across the side walls of said vessel.

Furthermore, it can also be seen from FIGS. 2 and 3 that walls 6, and 7, when viewed from the front expand outward from each other at a far greater angle then do exterior walls 6, and 4. Thus the front and rear walls of the vessel are more tapered than are the side walls of said vessel. However, this is merely a description of the preferred embodiment; and any vessel regardless of its dimensions or shape can employ the novel features of this invention if the vessel is an upright elongate walled vessel of tapered form and enlarges in cross-sectional area from the uppermost end to the lowermost end.

I claim:

1. In apparatus for leaching ore,
   an upright elongate walled vessel of tapered form having a minimum cross-sectional area at the uppermost end thereof enlarging to a maximum cross-sectional area proximate the lower end thereof for containing said ore,
   a plurality of manifolds connected to said vessel at a plurality of vertically spaced-apart locations along the length of said vessel between said uppermost end and said lower end thereof, each of said manifolds having a plurality of individual passages communicating said manifolds to said vessel for injecting leaching solution into said vessel at each said vertically spaced-apart location,
   a plurality of individual vertically and laterally spaced-apart passages proximate and within the lower end of said vessel for injecting fluid upward into said vessel,
   a plurality of channels in spaced-apart relationship and varying heights, each of said channels having a trapdoor mounted at the upper end thereof adapted to be selectively opened to receive the spent ore, said trapdoors being at different vertical heights relative to said lower end of said vessel for regulating the flow of spent ore down through the vessel and avoiding congestion of said spent ore,
   a center wall proximate the lower end of said vessel and perpendicular to the bottom wall of said vessel to serve as a divider between two common areas into which said spent ore will flow when said trapdoors are selectively opened,
   a plurality of pistons having at least two forked arms in a juxtaposed relationship to said trapdoors,
   a plurality of hydraulic cylinders proximate and within said lower end of said vessel, each said cylinder adapted to contain each said piston, each said cylinder supported by forked pillars which provide an arch under which the spent ore can be allowed to fall to the bottom of said vessel,
   a plurality of conventional hinges, each said hinge secured to the center of each said trapdoor so that when each said piston is raised by each said hydraulic cylinder, said forked arms of each said piston will cause each said trapdoor to move upward taking the shape of an inverted V when it is fully opened, thus permitting a passage for the movement of spent ore around each said trapdoor as the opposite ends of each said trapdoor draw closer together, and
   a plurality of regulated doors in spaced-apart relationship at the bottom of said vessel, beneath said hydraulic cylinders, for maintaining an even flow of spent ore through said vessel, each said regulated door adapted to be selectively opened for removal of said spent ore after said spent ore has passed into said common areas.

2. An apparatus for the chemical extraction of metal from tonnage of low grade ore in a continuous leaching cycle to allow maximum contact between the surface area of ore and the leaching liquor, and to avoid compaction within the center of the apparatus, said apparatus comprising:

an upright elongate walled vessel of tapered form, being greater in height than width and having a minimum cross-sectional area at the uppermost end thereof enlarging, at a uniformly changing rate, along the height thereof to a maximum cross-sectional area proximate the lower end thereof, said vessel having an opening at the top of said uppermost end, exposed to light, for the loading of tonnage of low grade ore into said opening to permit said ore and leaching liquor to move by gravity means downward and outward following the shape of said vessel, wherein the metal from said ore is dissolved in said leaching liquor as a result of an oxidation reduction reaction and the pregnant liquor solution is conveniently removed from said vessel for subsequent precipitation of the dissolved metal, a plurality of manifolds connected to said vessel at a plurality of vertically spaced-apart locations along the height of said vessel, each of said manifolds having a plurality of individual passages communicating said manifolds to said vessel and to inject leaching liquor into said vessel across the width of said vessel at each said vertically spaced-apart location, a plurality of individual vertically and laterally spaced-apart passages proximate and within said lower end of said vessel for injecting air upward into said vessel to replenish air consumed in said oxidation reduction reaction which is catalyzed by bacteria, which thrive in the absence of bright light, at least one upstanding hollow elongate chamber adjacent to said walled vessel and having an open base portion on said chamber communicating with the interior of said vessel into which the sand and fines and pregnant liquor containing the dissolved metal will flow, fluid removal means connected to said chamber intermediate the ends thereof and adapted to remove said pregnant liquor from said chamber at a fluid level higher than said open base portion, said sand and fines being allowed to settle out proximate said open base portion at a level below which said pregnant liquor is removed from said chamber, a plurality of channels in spaced-apart relationship and varying heights, each of said channels having a trapdoor mounted at the upper end thereof adapted to be selectively opened to receive the spent ore, said trapdoors being at different vertical heights relative to said lower end of said vessel for regulating the flow of spent ore down through the vessel and avoiding congestion of said spent ore, and a center wall proximate the lower end of said vessel and perpendicular to the bottom wall of said vessel to serve as a divider between two common areas into which said spent ore will flow when said trapdoors are selectively opened.

3. An apparatus for the chemical extraction of metal from tonnage of low grade ore in a continuous leaching cycle to allow maximum contact between the surface area of ore and the leaching liquor, and to avoid compaction within the center of the apparatus, said apparatus comprising:

an upright elongate walled vessel of tapered form, being greater in height than width and having a minimum cross-sectional area at the uppermost end thereof enlarging, at a uniformly changing rate, along the height thereof to a maximum cross-sectional area proximate the lower end thereof, said vessel having an opening at the top of said uppermost end, exposed to light, for the loading of tonnage of low grade ore into said opening to permit said ore and leaching liquor to move by gravity means downward and outward following the shape of said vessel, wherein the metal from said ore is dissolved in said leaching liquor as a result of an oxidation reduction reaction and the pregnant liquor solution is conveniently removed from said vessel for subsequent precipitation of the dissolved metal, a plurality of manifolds connected to said vessel at a plurality of vertically spaced-apart locations along the height of said vessel, each of said manifolds having a plurality of individual passages communicating said manifolds to said vessel and to inject leaching liquor into said vessel across the width of said vessel at each said vertically spaced-apart location, a plurality of individual vertically and laterally spaced-apart passages proximate and within said lower end of said vessel for injecting air upward into said vessel to replenish air consumed in said oxidation reduction reaction which is catalyzed by bacteria, which thrive in the absence of bright light, at least one upstanding hollow elongate chamber adjacent to said walled vessel and having an open base portion on said chamber communicating with the interior of said vessel into which the sand and fines and pregnant liquor containing the dissolved metal will flow, fluid removal means connected to said chamber intermediate the ends thereof and adapted to remove said pregnant liquor from said chamber at a fluid level higher than said open base portion, said sand and fines being allowed to settle out proximate said open base portion at a level below which said pregnant liquor is removed from said chamber, a plurality of channels in spaced-apart relationship and varying heights, each of said channels having a trapdoor mounted at the upper end thereof adapted to be selectively opened to receive the spent ore, said trapdoors being at different vertical heights relative to said lower end of said vessel for regulating the flow of spent ore down through the vessel and avoiding congestion of said spent ore, a center wall proximate the lower end of said vessel and perpendicular to the bottom wall of said vessel to serve as a divider between two common areas into which said spent ore will flow when said trapdoors are selectively opened, a plurality of pistons having at least two forked arms in a juxtaposed relationship to said trapdoors, a plurality of hydraulic cylinders proximate and within said lower end of said vessel, each said cylinder adapted to contain each said piston, each said cylinder supported by forked pillars which provide an arch under which the spent ore can be allowed to fall to the bottom of said vessel, and a plurality of conventional hinges, each said hinge secured to the center of each said trapdoor so that when each said piston is raised by each said hydraulic cylinder, said forked arms of each said piston will cause each said trapdoor to move upward taking the shape of an inverted-V when it is fully opened, thus permitting a passage for the movement of spent ore around each said trapdoor as the opposite ends of each said trapdoor draw closer together.

4. An apparatus for the chemical extraction of metal from tonnage of low grade ore in a continuous leaching cycle to allow maximum contact between the surface area of ore and the leaching liquor, and to avoid compaction within the center of the apparatus, said apparatus comprising:

an upright elongate walled vessel of tapered form, being greater in height than width and having a minimum cross-sectional area at the upper most end thereof enlarging, at a uniformly changing rate, along the height thereof to a maximum cross-sectional area proximate the lower end thereof, said vessel having an opening at the top of said uppermost end, exposed to light, for the loading of tonnage of low grade ore into said opening to permit said ore and leaching liquor to move by gravity means downward and outward following the shape of said vessel wherein the metal from said ore is dissolved in said leaching liquor as a result of an oxidation reduction reaction and the pregnant liquor solution is conveniently removed from said vessel for subsequent precipitation of the dissolved metal, a plurality of manifolds connected to said vessel at a plurality of vertically spaced-apart locations along the height of said vessel, each of said manifolds having a plurality of individual passages communicating said manifolds to said vessel and to inject leaching liquor into said vessel across the width of said vessel at each said vertically spaced-apart location, a plurality of individual vertically and laterally spaced-apart passages proximate and within said lower end of said vessel for injecting air upward into said vessel to replenish air consumed in said oxidation reduction reaction which is catalyzed by bacteria, which thrive in the absence of bright light, at least one upstanding hollow elongate chamber adjacent to said walled vessel and having an open base portion on said chamber communicating with the interior of said vessel into which the sand and fines and pregnant liquor containing the dissolved metal will flow, fluid removal means connected to said chamber intermediate the ends thereof and adapted to remove said pregnant liquor from said chamber at a fluid level higher than said open base portion said sand and fines being allowed to settle out proximate said open base portion at a level below which said pregnant liquor is removed from said chamber, a plurality of channels in spaced-apart relationship and varying heights, each of said channels having a trapdoor mounted at the upper end thereof adapted to be selectively opened to receive the spent ore, said trapdoors being at different vertical heights relative to said lower end of said vessel for regulating the flow of spent ore down through the vessel and avoiding congestion of said spent ore, a center wall proximate the lower end of said vessel and perpendicular to the bottom wall of said vessel to serve as a divider between two common areas into which said spent ore will flow when said trapdoors are selectively opened, a plurality of pistons having at least two forked arms in a juxtaposed relationship to said trapdoors, a plurality of hydraulic cylinders proximate and within said lower end of said vessel, each said cylinder adapted to contain each said piston, each said cylinder supported by forked pillars which provide an arch under which the spent ore can be allowed to fall to the bottom of said vessel, a plurality of conventional hinges, each said hinge secured to the center of each said trapdoor so that when each said piston is raised by each said hydraulic cylinder, said forked arms of each said piston will cause each said trapdoor to move upward taking the shape of an inverted V when it is fully opened, thus permitting a passage for the movement of spent ore around each said trapdoor as the opposite ends of each said trapdoor draw closer together, and a plurality of regulated doors in spaced-apart relationship at the bottom of said vessel, beneath said hydraulic cylinders, for maintaining an even flow of spent ore through said vessel, each said regulated door adapted to be selectively opened for removal of said spent ore after said spent ore has passed into said common areas.

* * * * *